(12) United States Patent
Rouby et al.

(10) Patent No.: US 12,508,762 B2
(45) Date of Patent: Dec. 30, 2025

(54) PROCESS FOR MANUFACTURING A TREAD BY COEXTRUSION WITH INTEGRATION OF A DECOUPLING INTERFACE BETWEEN TREAD PATTERN BLOCKS AND REINFORCING WEDGES

(71) Applicant: Compagnie Generale Des Etablissements Michelin, Clermont-Ferrand (FR)

(72) Inventors: Mickael Rouby, Clermont-Ferrand (FR); Dominique Denis, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 234 days.

(21) Appl. No.: 18/038,556

(22) PCT Filed: Sep. 7, 2021

(86) PCT No.: PCT/FR2021/051528
§ 371 (c)(1),
(2) Date: May 24, 2023

(87) PCT Pub. No.: WO2022/112667
PCT Pub. Date: Jun. 2, 2022

(65) Prior Publication Data
US 2024/0001604 A1    Jan. 4, 2024

(30) Foreign Application Priority Data
Nov. 27, 2020 (FR) ...................................... 2012251

(51) Int. Cl.
*B29C 48/21* (2019.01)
*B29C 48/12* (2019.01)
(Continued)

(52) U.S. Cl.
CPC .............. *B29C 48/21* (2019.02); *B29C 48/12* (2019.02); *B29C 48/19* (2019.02); *B29C 48/307* (2019.02);
(Continued)

(58) Field of Classification Search
CPC ......... B29C 48/07; B29C 48/12; B29C 48/19; B29C 48/21; B29C 48/3001;
(Continued)

(56) References Cited

U.S. PATENT DOCUMENTS

2013/0174952 A1   7/2013   Abad et al.
2019/0001547 A1*  1/2019   Bessac ................... B29D 30/52
(Continued)

FOREIGN PATENT DOCUMENTS

WO    2012028429 A1   3/2012
WO    2017146734 A1   8/2017
(Continued)

*Primary Examiner* — Xiao S Zhao
*Assistant Examiner* — Joseph S Leyson
(74) *Attorney, Agent, or Firm* — Dickinson Wright PLLC

(57) ABSTRACT

The present disclosure relates to a coextrusion process for manufacturing a profiled element intended to form a tread for a pneumatic tire. The process includes coextruding a first elastomer compound forming an underlayer and reinforcing wedges, a second elastomer compound forming tread pattern blocks supported laterally by the wedges, and a third elastomer compound. The third elastomer compound is different from the first and second elastomer compounds and is interposed between the lateral wall of each wedge and the corresponding tread pattern block so as to form a decoupling interface for separating the mechanical behavior of the wedge from that of the tread pattern block.

16 Claims, 4 Drawing Sheets

(51) Int. Cl.
  *B29C 48/19* (2019.01)
  *B29C 48/305* (2019.01)
  *B29C 48/35* (2019.01)
  *B29C 48/49* (2019.01)
  *B29L 30/00* (2006.01)

(52) U.S. Cl.
  CPC .............. *B29C 48/35* (2019.02); *B29C 48/49* (2019.02); *B29L 2030/002* (2013.01)

(58) Field of Classification Search
  CPC ....... B29C 48/307; B29C 48/35; B29C 48/49; B29L 2030/002; B29D 30/52
  See application file for complete search history.

(56) References Cited

U.S. PATENT DOCUMENTS

| | | | |
|---|---|---|---|
| 2020/0094463 A1* | 3/2020 | Rouby | B29C 48/35 |
| 2020/0101655 A1* | 4/2020 | Rouby | B29C 48/08 |
| 2020/0114565 A1 | 4/2020 | Rouby et al. | |

FOREIGN PATENT DOCUMENTS

| | | |
|---|---|---|
| WO | 2019002782 A1 | 1/2019 |
| WO | 2019081362 A1 | 5/2019 |

\* cited by examiner

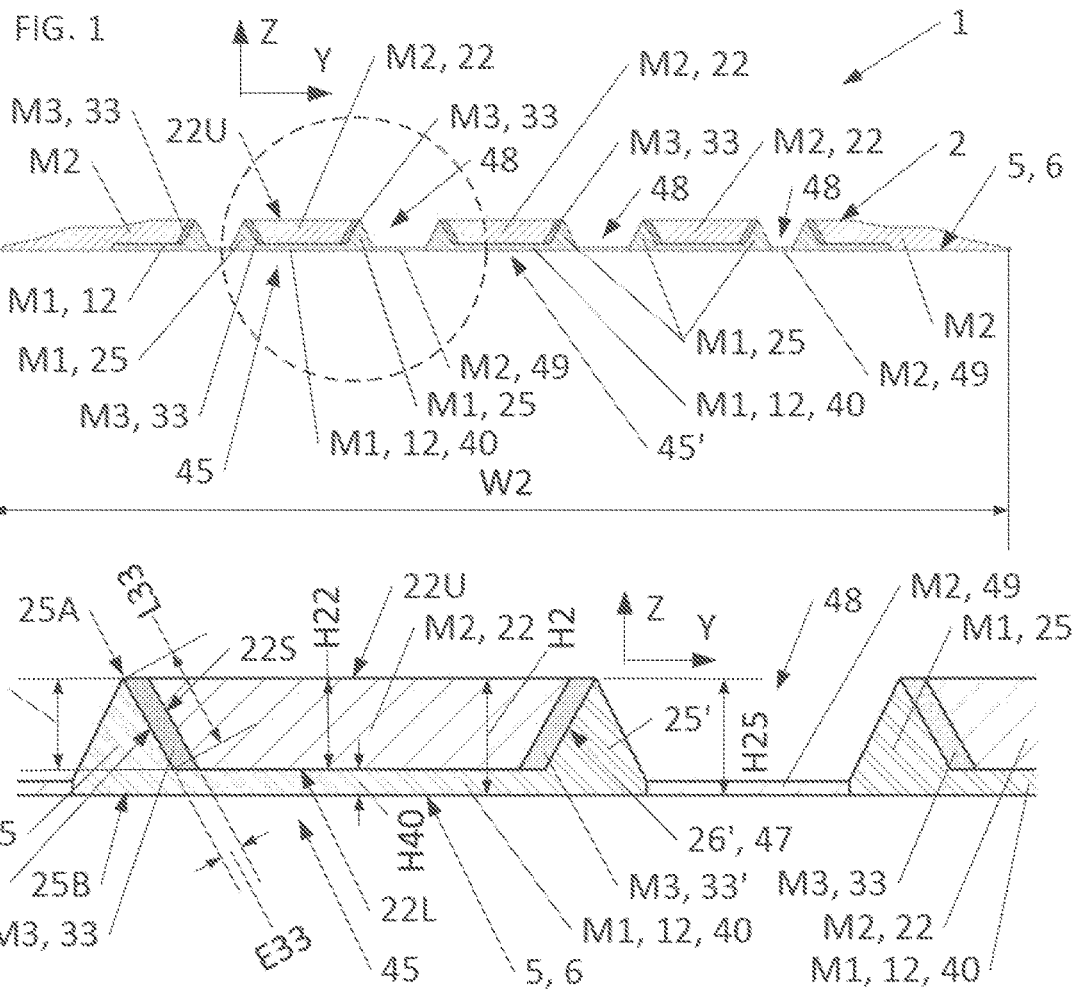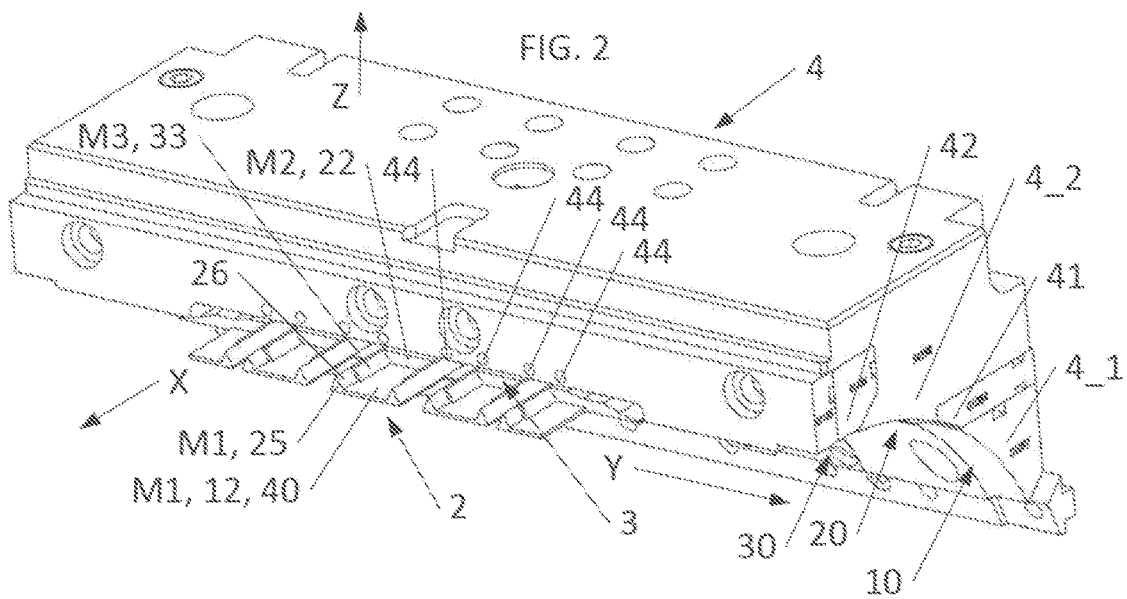

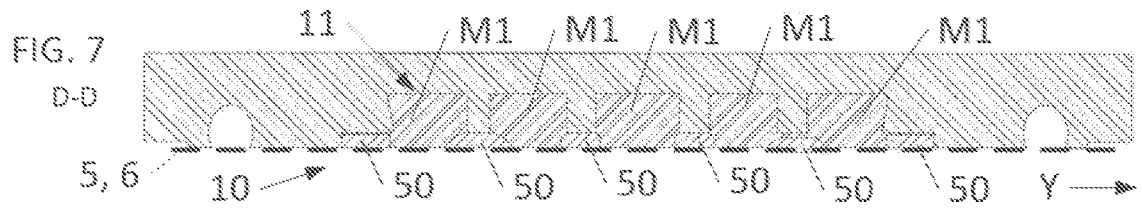
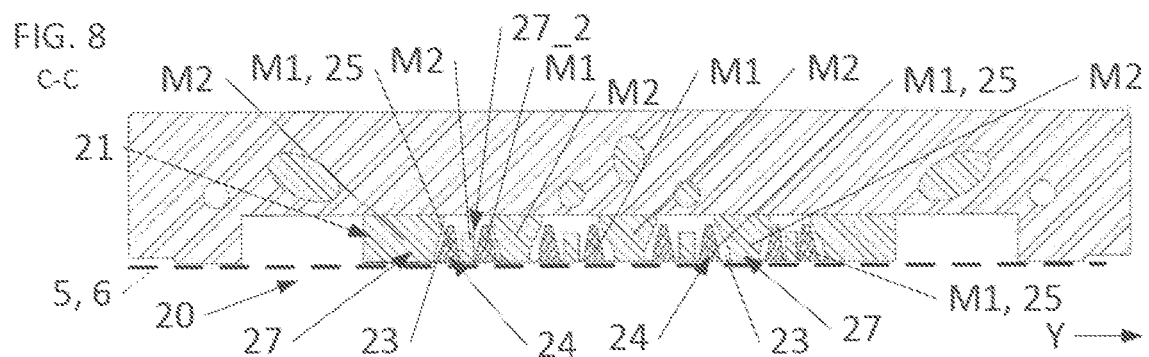
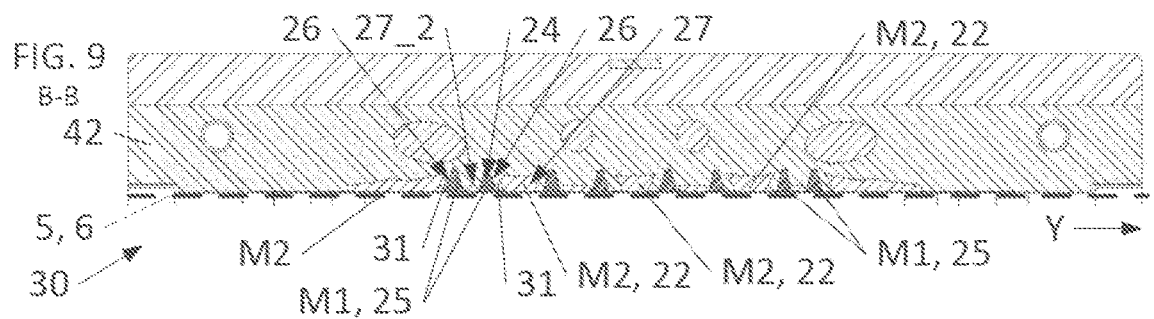
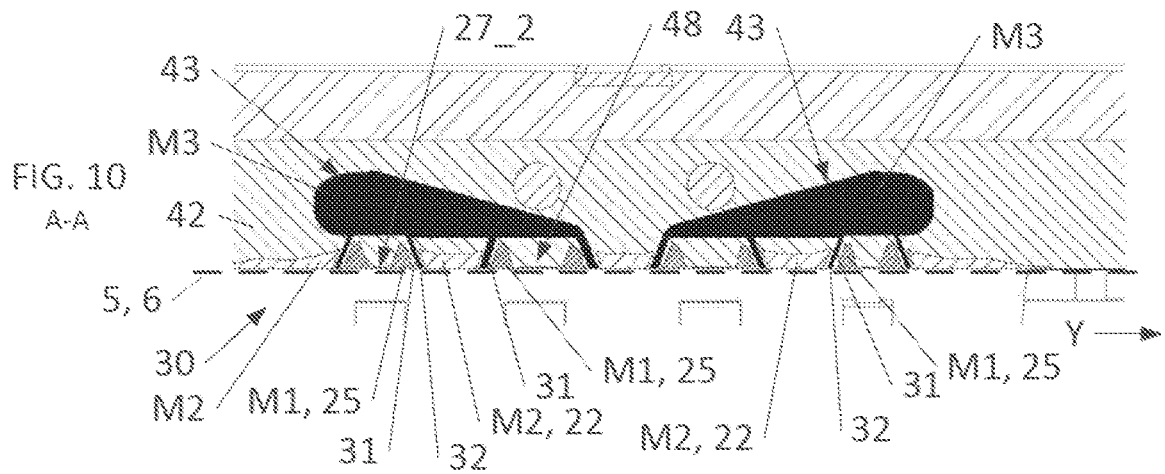

PROCESS FOR MANUFACTURING A TREAD BY COEXTRUSION WITH INTEGRATION OF A DECOUPLING INTERFACE BETWEEN TREAD PATTERN BLOCKS AND REINFORCING WEDGES

CROSS-REFERENCE TO RELATED APPLICATION

This application claims priority to and the benefit of PCT Patent Application No. PCT/FR2021/051528 filed on 7 Sep. 2021, entitled "PROCESS FOR MANUFACTURING A TREAD BY COEXTRUSION WITH INTEGRATION OF A DECOUPLING INTERFACE BETWEEN TREAD PATTERN BLOCKS AND REINFORCING WEDGES", and French Patent Application No. FR2012251, filed on 27 Nov. 2020, entitled "PROCESS FOR MANUFACTURING A TREAD BY COEXTRUSION WITH INTEGRATION OF A DECOUPLING INTERFACE BETWEEN TREAD PATTERN BLOCKS AND REINFORCING WEDGES".

BACKGROUND

1. Field

The present disclosure relates to the general field of coextrusion processes and installations for producing profiled elements based on elastomer compounds, notably profiled elements used in manufacturing tires for vehicle wheels, particularly pneumatic tires, and more particularly profiled elements forming treads.

2. Related Art

In order to enable the tires of vehicle wheels to meet the necessary requirements for roadholding and low rolling resistance, there is a known way of producing treads that combine a plurality of functional elements, namely, in the first place, a radially inner underlayer made of a first elastomer compound and intended to be applied on the reinforcement of the tire crown, a radially outer layer formed by a second elastomer compound, different from the first elastomer compound and intended to form the tread pattern blocks of the tread, which will come into contact with the roadway when the tire is used on a vehicle, and, finally, circumferential reinforcements, usually having a triangular cross section, which are formed from an elastomer compound that has stiffer behavior than the second elastomer compound forming the tread pattern blocks, and which are intended to support the tread pattern blocks laterally when drift deformation is encountered, that is to say when lateral shear deformation is encountered in a plane containing the central axis of rotation of the tire.

To produce such profiled elements, the present applicant has already developed suitable coextrusion equipment, as described, notably, in applications WO-2019/002782 and WO-2019/081362, in which provision is made, among other aspects, for providing an extrusion head with a channel of triangular section for forming the circumferential reinforcer in one piece with the underlayer, while postponing the joining of the second elastomer compound, forming the tread pattern blocks, to said circumferential reinforcer, in order to avoid destabilizing or deforming said reinforcer during the extrusion.

Although it cannot be denied that treads produced in this way have provided satisfactory, there is still a constant search for further improvement in the performance of said treads, particularly in the compromise between grip and rolling resistance, that is to say between roadholding and energy consumption.

The object of the disclosure is therefore to propose a process for making, by means of coextrusion, a tread that is improved in this respect.

SUMMARY

The object of the disclosure is achieved by means of a process for manufacturing a tread for the tire of a vehicle wheel, in the course of which process a profiled element is formed by jointly extruding a plurality of elastomer compounds, in a common direction of flow corresponding to the longitudinal direction of said profiled element, through a gap which is delimited on the one hand by an extrusion head and on the other hand by a receiving surface such as a roller, such that the section of the profiled element can be shaped in thickness along a direction called the "vertical direction" which is perpendicular to the longitudinal direction and to the receiving surface, and in width along a direction called the "lateral direction" which is perpendicular to the longitudinal direction and to the vertical direction, said process comprising a first step (a) in which, in a first portion of the extrusion head provided with first inlet channels, a first elastomer compound is introduced into the gap through said first inlet channels and comes into contact with the receiving surface to form an underlayer, and then a second step (b) in which, in a second portion of the extrusion head located downstream of the first portion of the extrusion head in the longitudinal direction and provided with second inlet channels, a second elastomer compound intended to form a tread pattern block is introduced into the gap through said second inlet channels, the second portion of the extrusion head having at least one separating partition which projects into the thickness of the gap and which extends continuously in the longitudinal direction so that said separating partition delimits, on either side of said separating partition in the lateral direction, on the one hand a shaping channel enabling part of the first elastomer compound to form, in one piece with the underlayer, a protrusion called a "wedge" which projects in the vertical direction for the purpose of providing support for the tread pattern block in the lateral direction, said wedge having for this purpose a lateral wall which runs along the separating partition and which, in a cross section normal to the longitudinal direction, extends in a direction secant to the receiving surface, and, on the other hand, a flow channel which enables the second elastomer compound to flow along the second portion of the extrusion head, in contact with the separating partition, parallel to the lateral wall of the wedge and without forming a joint with said lateral wall of the wedge, said process being characterized in that it comprises a third step (c) in which, in a third portion of the extrusion head extending downflow of the second portion of the extrusion head, an injector is provided, the injector being located in the longitudinal prolongation of the separating partition in the longitudinal direction and being provided with an injection slot through which a third elastomer compound, different from the first and second elastomer compounds, is injected, in such a way that said third elastomer compound is placed between, and forms a joint with, the first elastomer compound emerging from the shaping channel and the second elastomer compound emerging from the flow characterized, by covering the lateral wall of the wedge so as to form an interface layer called the "decoupling interface" which isolates said lateral wall of the wedge from the tread pattern block while enabling said tread pattern block to come to bear laterally against said lateral wall of the wedge indirectly via said decoupling interface.

Advantageously, because of the presence of the decoupling interface according to the disclosure, it is possible, in the first place, for said decoupling interface to absorb, in the same way as a damping pad, some of the lateral tilting of the tread pattern block when said tread pattern block is subjected to lateral stress, thus limiting the lateral tilting of the wedge and resulting in better performance, in terms of lateral grip and therefore of drift behavior, of the tread produced from the profiled element.

Furthermore, and more generally, the use of a decoupling interface according to the disclosure advantageously makes it possible, while retaining a link between the wedge and the tread pattern block, said link enabling said wedge to support the tread pattern block effectively against lateral forces, to dissociate mechanically, at least partially, despite the presence of the aforementioned link, the operation of the tread pattern block from the operation of the reinforcing wedge and vice versa, so that each of these structures, that is to say the tread pattern block on the one hand and the reinforcing wedge on the other hand, can operate substantially independently of the other.

It is therefore possible to gain the maximum functional benefit of each type of structure, namely, in this case, the grip provided by the tread pattern blocks, which are preferably relatively flexible, and the stiffness in drift provided by the reinforcing wedges which are preferably stiffer than the tread pattern blocks, without the presence of any given structure significantly modifying or degrading the behavior and performance of the other structure.

Moreover, the structure according to the disclosure with the decoupling interface can reduce both the rolling resistance and the thermal dissipation due to hysteresis within the tire during running.

BRIEF DESCRIPTION OF THE DRAWINGS

Other objects, characteristics and advantages of the disclosure will be apparent in greater detail from a perusal of the following description, with the aid of the appended drawings, provided solely for illustrative purposes and in a non-limiting way, in which:

FIG. 1 shows, in a cross-sectional view normal to the longitudinal direction of the profiled element, an example of a profiled element produced by a process according to the disclosure and intended to form a tread, together with an enlarged detail view of said profiled element.

FIG. 2 shows, in a perspective view from above, an extrusion head for manufacturing the profiled element of FIG. 1, together with a cutaway view of the corresponding profiled element.

FIG. 7 shows, in a sectional view normal to the longitudinal direction of flow, the admission of the first elastomer compound for shaping the underlayer, and the distribution of said first elastomer compound between a plurality of scrapers, inside the first portion of the extrusion head of FIG. 6.

FIG. 8 shows, in a sectional view normal to the longitudinal direction of flow, inside the second portion of the extrusion head, the admission of the second elastomer compound for forming the tread pattern blocks, together with the parallel flows of said second elastomer compound and said first elastomer compound shaped into a wedge, in their respective channels separated by the separating partitions.

FIG. 9 shows, in a sectional view normal to the longitudinal direction of flow, the arrival in the third portion of the extrusion head of the first and second elastomer compounds, still separated from each other by the injectors which are located in the prolongations of the separating partitions of the extrusion head.

FIG. 10 shows, in a sectional view normal to the longitudinal direction of flow, the injection of the third elastomer compound through the slots of the injectors, for forming the decoupling interfaces that are laterally interposed between the tread pattern blocks and the reinforcing wedges that laterally support said tread pattern blocks.

DESCRIPTION OF EMBODIMENTS

Figure 3:
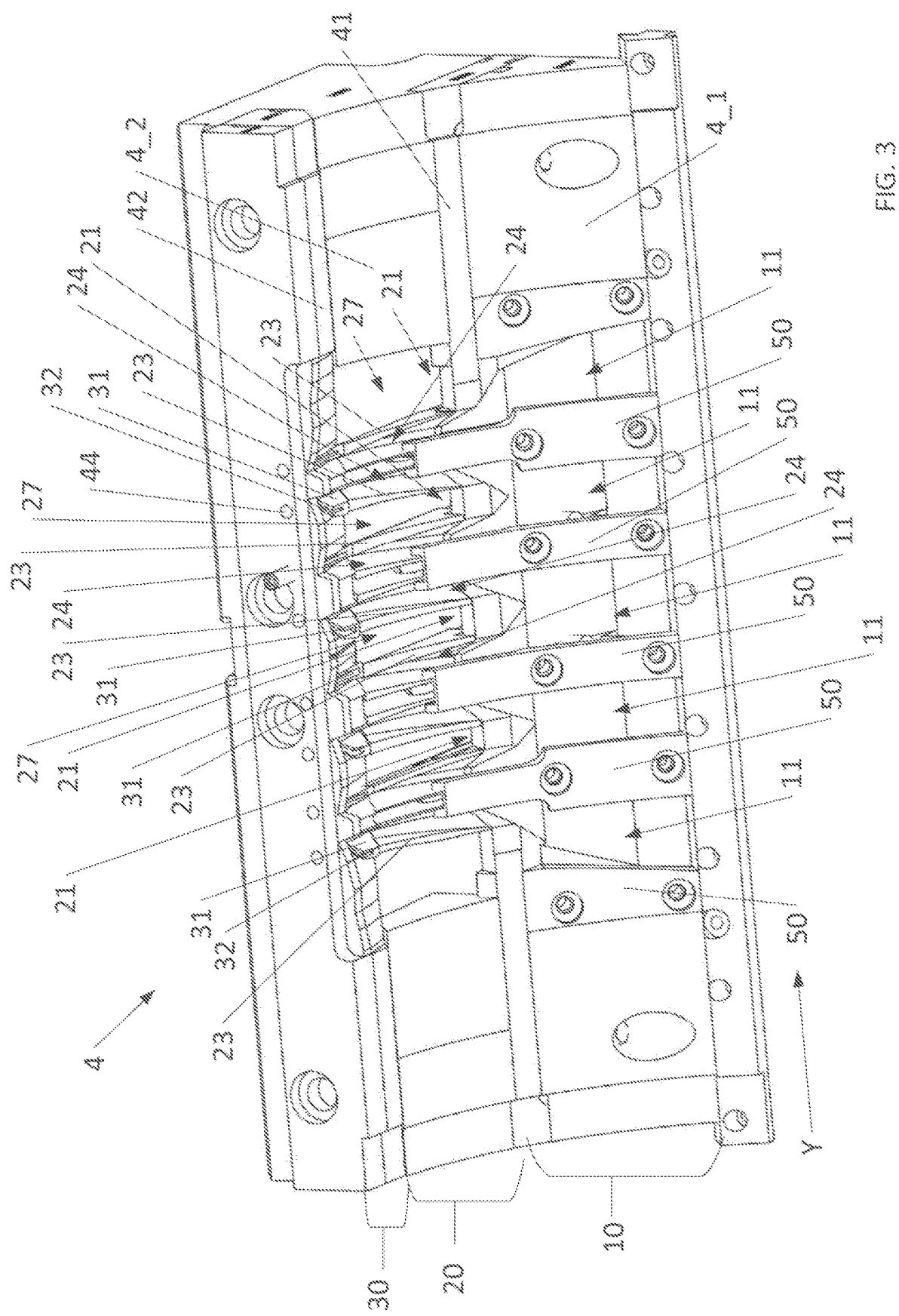
FIG. 3 shows the extrusion head of FIG. 2 in a perspective view from below.
Figure 6:
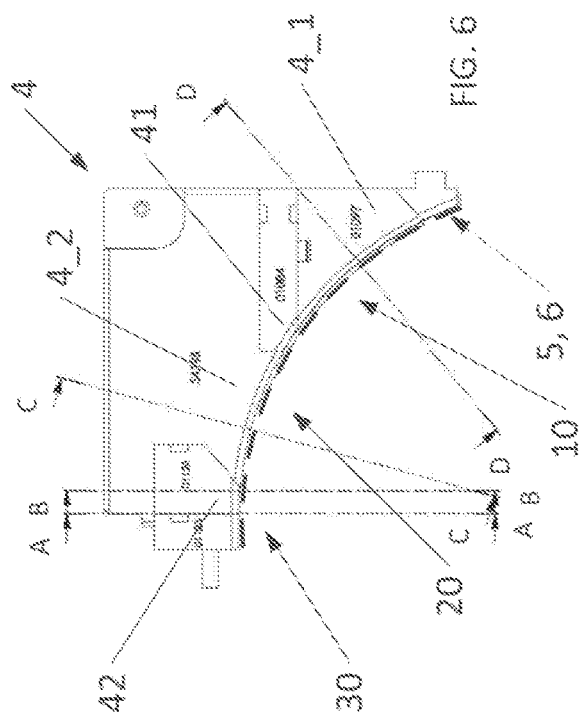
FIG. 6 shows the extrusion head of FIGS. 2 to 5 in a side view.

The present disclosure relates to a process for manufacturing a tread 1 for a tire of a vehicle wheel.

Said wheel tire may be a pneumatic tire, in which the tread is supported pneumatically by a pressurized gas, or a non-pneumatic tire, called an "airless" tire, in which the tread 1 is supported mechanically by solid spokes which link said tread 1 to the rim.

In the course of this process, a profiled element 2 is formed by jointly extruding, in a common direction of flow corresponding to the longitudinal direction X of said profiled element 2, a plurality of elastomer compounds M1, M2, M3, through a gap 3 which is delimited on the one hand by an extrusion head 4 and on the other hand by a receiving surface 5, such as a roller 6, making it possible to shape the cross section of the profiled element 2, in thickness H2 along a direction called the "vertical direction" Z, which is perpendicular to the longitudinal direction X and to the receiving surface 5, and in width W2 along a direction called the "lateral direction" Y, which is perpendicular to the longitudinal direction X and to the vertical direction Z.

An example of a cross section of such a profiled element 2 for forming a tread 1 is shown in FIG. 1.

The receiving surface 5 is advantageously movable with respect to the extrusion head 4, so that it can be driven so as to move along the longitudinal direction X, and thus accompany, or even pull along, the profiled element 2 while said profiled element 2 is being generated by coextrusion.

In principle, the receiving surface 5 could be formed by a flat surface such as a conveyor belt.

Preferably, however, the receiving surface 5 is formed by a roller 6, and more particularly by the external radial surface of revolution of said roller 6, said roller 6 being mounted rotatably about its central axis, which central axis is preferably orientated parallel to the lateral direction Y, and therefore perpendicularly to the longitudinal direction X. Said roller 6 preferably takes the form of a right cylinder with a circular base.

For ease of description, with reference to such a roller 6 and/or with reference to the arrangement of the finished tire into which the tread 1 is integrated, it may be considered that the longitudinal direction X is similar to the "circumferential" direction the lateral direction Y is similar to the "axial" direction, and the vertical direction Z is similar to the "radial" direction.

Regardless of the shape of the receiving surface 5, the extrusion head 4 preferably has a substantially mating shape so that it covers the receiving surface over a common overlap area defining the gap 3. Thus, in particular, when the extrusion head 4 interacts with a roller 6, said extrusion head 4 will have an overall cylindrical mating shape in the form of an arc of a circle, preferably centered on the central axis of the roller 6.

The profiled element 2 is advantageously continuously generated in the direction of its length, along the longitudinal direction X.

The concepts of "upstream" and "downstream" will be interpreted here with reference to the overall direction of flow of the profiled element, which travels from upstream to downstream along the longitudinal direction.

The process according to the disclosure comprises a first step (a) in which, in a first portion 10 of the extrusion head 4 provided with first inlet channels 11, a first elastomer compound M1 is introduced into the gap 3 through said first inlet channels 11, and comes into contact with the receiving surface 5 to form an underlayer 12.

Said underlayer 12 is intended to bear on and around the crown reinforcement of the tire into which the tread 1 will be integrated.

Preferably, the first elastomer compound M1 is a mixture based on unvulcanized rubber.

The process then comprises a second step (b) in which, in a second portion 20 of the extrusion head 4, which is located downstream of the first portion 10 of the extrusion head along the longitudinal direction X, and which is provided with second inlet channels 21, a second elastomer compound M2, intended to form a tread pattern block 22, is introduced into the gap 3 through said second inlet channels 21.

In practice, at least one tread pattern block 22, or more preferably a plurality of tread pattern blocks 22 distributed over the width W2 of the profiled element 2, will be formed in this way. In the tire, said tread pattern blocks 22 will form the radially outer surface of said tire, intended to come into contact with the roadway. In the finished tire, and if necessary after said tire has undergone curing to vulcanize one and/or another of the first, second and third elastomer compounds M1, M2, M3, said tread pattern blocks 22 may preferably exhibit, in a known way, grooves for enhancing the grip of the tire on the roadway.

Preferably, the second elastomer compound M2 is a mixture based on unvulcanized rubber.

Figure 4:
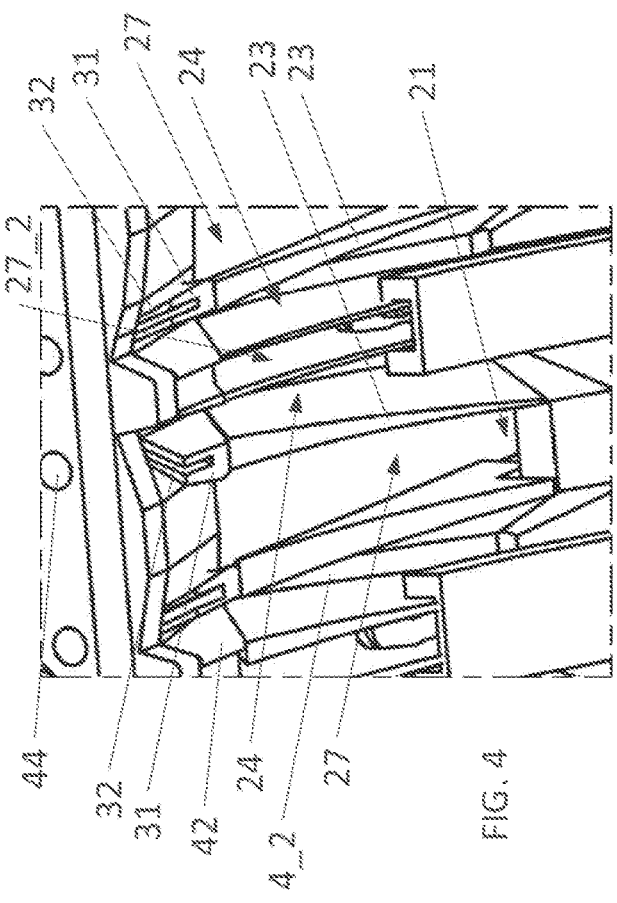
FIG. 4 shows, in a partial perspective view, the detail of the extrusion head of FIG. 3.

As is apparent from FIGS. 3, 4 and 8, the second portion 20 of the extrusion head 4 has at least one separating partition 23 which projects into the thickness of the gap 3, here along a radial component running from the extrusion head 4 towards the axis of rotation of the roller 6, and which extends continuously in the longitudinal direction X, so that said separating partition 23 delimits, on either side of said separating partition 23 in the lateral direction Y:

on the one hand, a shaping channel 24 which allows some of the first elastomer compound M1 to form, in one piece with the underlayer 12, a protrusion 25 called a "wedge" 25, which projects in the vertical direction Z, here along the centrifugal radial direction with respect to the axis of the roller 6, for the purpose of providing a support for the tread pattern block 22 in the lateral direction Y, said wedge 25 having for this purpose a lateral wall 26 which runs along the separating partition 23 and which, in a cross section normal to the longitudinal direction X, extends in a direction secant to the receiving surface 5, and, on the other hand, a flow channel 27 which allows the second elastomer compound M2 to flow along the second portion 20 of the extrusion head, in contact with the separating partition 23, parallel to the lateral wall 26 of the wedge 25, without forming a joint with said lateral wall 26 of the wedge 25.

Advantageously, by forming the wedge 25 in one piece with the underlayer 12, said wedge 25 is made to have the correct seating and the correct stiffness, and can thus effectively support the tread pattern block 22 against lateral forces.

Advantageously, the presence of the separating partition 23, which extends from upstream to downstream, from an upstream end located upstream of, or at the same position as, the mouths of the second inlet channels 21, to the downstream end of the second portion 20 of the extrusion head 4, makes it possible, within said second portion 20 of the extrusion head, to keep the flow of first elastomer compound M1 forming the wedge 25 separate from the flow of second elastomer compound M2, because said flows each flow on a different side of said separating partition 23, along the respective two opposite faces of said separating partition 23. Thus the presence of the separating partition 23 makes it possible, in said second portion 20 of the extrusion head, to protect the wedge 25, being formed inside the shaping channel 24 of the intake, from the entry and flow of second elastomer compound M2, making it unnecessary to expose said wedge 25 prematurely to other adjacent flows of elastomer compounds M2, M3, and thus allowing said wedge 25 to become stabilized to the point where any deformation of said wedge 25 is prevented.

This ensures that the process and the geometry of the wedge 25 can be properly controlled.

In order to adapt to the geometry of the wedge 25, while having a relatively simple shape, the separating partition 23, and more generally the opposite faces which delimit said separating partition 23 laterally and which come into contact, respectively, with the first elastomer compound M1 flowing in the shaping channel 24 and with the second elastomer compound M2 flowing in the flow channel 27, preferably extend at an angle of between 30 and 90 degrees to the receiving surface 5, or more preferably obliquely, for example at an angle of between 30 degrees and 85 degrees to the receiving surface 5, when said separating partition 23 and its side faces are viewed in a cross section normal to the longitudinal direction X.

Preferably, the wedge 25 has, in a cross section normal to the longitudinal direction X, a cross section of triangular shape, whose base 25B rests on the receiving surface 5 and whose peak 25A points towards the extrusion head 4.

Such a shape advantageously combines stability with robustness and relative simplicity of forming.

The lateral wall 26 of the wedge 25 then forms one side of the triangular shape, preferably a segment of straight line, which is inclined with respect to the vertical direction Z, and which joins the base 25B to the peak 25A.

Evidently, the shape of the cross section of the shaping channel 24 will correspond to the desired cross section of the wedge 25. In its cross section normal to the longitudinal direction X, said shaping channel 24 will thus take the form of a concave, or preferably triangular, shape, which is open on the receiving surface 5, and which, in this case, will preferably widen out from the extrusion head 4, to which the separating partition 23 is attached, towards the receiving surface 5.

Advantageously, the separating wall 23, which is solid and is preferably made in one piece with the wall of the second portion 20 of the extrusion head 4 that forms the upper limit of the gap 3 in the vertical direction Z, will make it possible to reserve a space between, on the one hand, the flow of first elastomer compound M1 that forms the underlayer 12 and the wedge 25 and, on the other hand, the flow of second elastomer compound M2 that forms the tread pattern block 22, said space being provisionally occupied by said separating partition 23, while the process is taking place within the second portion 20 of the head. In this specific space that has been reserved in this way by the separating partition 23, a layer of third elastomer compound M3 can then be substituted for said separating partition 23, in order to form a decoupling interface 33, as detailed below.

This is because, according to the disclosure, the method comprises a third step (c) in which, in a third portion 30 of the extrusion head 4, which third portion 30 of the extrusion head lies downstream of the second portion 20 of the extrusion head, an injector 31 is provided, this injector being located in the longitudinal prolongation of the separating partition 23 in the longitudinal direction X, and being provided with an injection slot 32 through which is injected a third elastomer compound M3, different from the first elastomer compound M1 and the second elastomer compound M2, so that said third elastomer compound M3 is positioned between, and forms a joint with, the first elastomer compound M1 emerging from the shaping channel 24, on the one hand, and the second elastomer compound M2 emerging from the flow channel 27, on the other hand, by covering the lateral wall 26 of the wedge 25, so as to form an interface layer 33 called the "decoupling interface" 33 which isolates said lateral wall 26 of the wedge 25 from the tread pattern block 22, while allowing said tread pattern block 22, more particularly in this case the lateral wall 22S of said tread pattern block located facing the lateral wall 26 of the wedge 25, to come to bear thus indirectly and laterally against said lateral wall 26 of the wedge 25, via said decoupling interface 33.

The decoupling interface 33 interposed in this way between the tread pattern block 22 and the wedge 25 advantageously prevents the tread pattern block 22 from being in direct contact with the wedge 25, and more particularly prevents the lateral face 22S of said tread pattern block, secant to the receiving face 5, from coming into direct contact with the corresponding lateral face 26 of the wedge 25.

Considered in a cross-sectional plane normal to the longitudinal direction X, the decoupling interface 33 will preferably extend for a length L33 in a main direction which is secant to the receiving surface 5, and more preferably in an oblique direction with respect to said receiving surface, corresponding in practice to the direction of extension of the lateral wall 26 of the wedge 25, as may be seen in the detail of FIG. 1. For guidance, said main direction of extension of the decoupling interface 33 may lie at an angle of 30 to 85 degrees relative to the receiving surface 5, and/or, in an equivalent manner, relative to the lateral direction Y.

According to a preferred variant implementation, the cross section of the decoupling interface 33 substantially takes the form of a parallelogram, with the major side of the parallelogram covering, preferably entirely, the lateral wall 26 of the wedge 25, one of the minor sides of the parallelogram bearing on the underlayer 12, and the other opposed minor side lying flush with the peak 25A of the wedge 25, preferably being located in the horizontal prolongation of the upper face 22U of the tread pattern block 22.

The injector 31 is advantageously located in the longitudinal continuity of the separating partition 23, so that there is no interruption between the downstream end of the separating partition 23 and the upstream end of the injector 31, which is adjacent to the downstream end of the separating partition, or possibly, in one variant (not shown), made in one piece with said separating partition 23. Because of this continuity, the injector 31 keeps the free space created by separating partition 23 between the tread pattern block 22 and the wedge 25 open, so that the third elastomer compound M3 can be injected into it, at the location thus provided for forming the decoupling interface 33.

Preferably, the injector 31 has a width, considered in the lateral direction Y, which is substantially equal to, or possibly slightly greater than, the solid width of the separating partition 23.

The injection slot 32 is preferably located on the downstream face of the injector 31, forming the trailing edge of said injector 31.

Advantageously, as soon as the downstream end of the injector 31 has been passed, that is to say beyond the trailing edge of said injector 31 in the direction of flow, the flow of first elastomer compound M1 emerging from the shaping channel 24 and the associated flow of second elastomer compound M2 emerging from the flow channel 27 converge on each other in the lateral direction Y, on either side of the interface layer 33 made of the third elastomer compound M3, on in opposition to each other with respect to said interface layer 33, and each come to lie against the flow of third elastomer compound M3, and therefore against said interface layer 33, so as to become assembled and superimposed on each other in a laminated arrangement in which, in the lateral direction Y, the interface layer 33 becomes sandwiched between the lateral wall 26 of the wedge 25 and the corresponding mating lateral wall 22S of the tread pattern block 22.

As mentioned above, the decoupling interface 33 thus interposed between the tread pattern block 22 and the lateral wall 26 of the wedge 25 forms a kind of spacer, in the lateral direction Y, which advantageously enables the mechanical behavior of the wedge 25 to be dissociated, to a certain degree at least, from the mechanical behavior of the tread pattern block 22, in order to allow full use to be made of each of them, and notably in order to reduce the rolling resistance, while maintaining the benefit of the lateral support of the tread pattern blocks 22 by the wedge 25 so as to limit any drift phenomena.

In the preferred arrangement in which the wedge 25 has a triangular cross section, the injector 31 and the injection slot 32 preferably extend in a straight line parallel to the side of the triangle that forms the lateral wall 26 of the wedge 25.

Preferably, the thickness H22 of the second elastomer compound M2 forming the tread pattern block 22, that is to say the height H22 of the tread pattern block 22 considered in the vertical direction Z between the lower face 22L of said tread pattern block 22, orientated towards the receiving surface 5, and the upper face 22U of said tread pattern block 22, which forms the radially outer face of the finished tire, is such that, relative to the receiving surface 5, the upper face 22U of the tread pattern block 22 is located at an altitude, considered in the vertical direction Z, which is greater than or equal to that of the point of the wedge 25 farthest from the receiving surface 5 in the vertical direction Z, that is to say the altitude of the peak 25A of the wedge 25.

Thus the wedge 25 does not project radially outwards beyond the tread pattern block 22 in the tire, in order to avoid interference with the contact between the tread pattern block and the roadway.

In a possible arrangement such as that shown in FIG. 1, the altitude of the upper face 22U of the tread pattern block 22 is equal to that of the peak of the wedge 25A, so that the peak 25A of the wedge 25 is flush with the upper face 22U of the adjacent tread pattern block 22, which bears on said wedge 25 via the decoupling interface 33.

The decoupling interface 33 preferably covers the whole of the lateral wall 26 of the wedge 25, in order to completely isolate said lateral wall 26 of the wedge 25 from the corresponding lateral wall of the tread pattern block 22.

Thus, preferably, the projected surface of the decoupling interface 33, considered in an imaginary projection plane normal to the lateral direction Y, and therefore parallel to the longitudinal direction X in this case, covers and coincides with the projected surface of the lateral wall 26 of the wedge 25 projected in the lateral direction Y in the same imaginary projection plane.

Consequently, the decoupling interface 33, and therefore the injection slot 32, preferably extend, in the vertical direction Z, over the whole of the height H33 which is common to the lateral wall 26 of the wedge 25 made of first elastomer compound M1 on the one hand, and to the tread pattern block 22 made of second elastomer compound M2, which bears laterally on said wedge 25 via said decoupling interface 33, on the other hand.

Advantageously, this complete covering of the lateral face 26 of the wedge 25 by the decoupling interface 33 provides effective mechanical decoupling, while retaining a lateral support of the tread pattern block 22 by the wedge 25 which is relatively uniform and distributed over an extended area.

It will be noted that the second elastomer compound M2 forming the tread pattern block 22 may preferably, outside the area covered by the decoupling interface 33, and more particularly outside the lateral face 22S located opposite the lateral face 26 of the wedge, come to bear directly, with its lower face 22L, that is to say with its radially inner face in the tire, against the first elastomer compound M1 of the underlayer 12, in a portion of said underlayer 12 forming an underlayer base 40.

Said underlayer base 40 preferably has a thickness H40, preferably constant along the lateral direction Y, which is strictly smaller than the height of the wedge 25, and which represents, preferably, less than 30%, or possibly less than 25%, of the overall height H25 of the wedge 25 in question in the vertical direction Z between the receiving surface 5 and the peak 25A of the wedge 25, and which is, for example, a thickness H40 less than or equal to 4 mm, or possibly less than or equal to 2 mm.

This underlayer base 40 advantageously makes it possible to provide lateral positioning and stability of the wedge or wedges 25 without significantly affecting the behavior of the tread pattern block 22 or the rolling resistance, because of its thinness.

It will also be noted that, for ease of description, and to avoid any confusion, reference is made preferably to a tread pattern block 22 and to a corresponding associated wedge 25, separating partition 23 and injector 31 for forming a corresponding decoupling interface 33. Clearly, therefore, the profiled element 2 may preferably, as clearly shown in FIG. 1, comprise a plurality of tread pattern blocks 22 distributed over its width W2, and a plurality of wedges 25 supporting these tread pattern blocks 22, for example with one wedge 25 or a pair of wedges 25 for every tread pattern block 22, and may provide a decoupling interface 33 at one or other or each area of interface between a lateral wall 26 of a wedge 25 and a tread pattern block 22, so that the extrusion head 4 is provided with the same number of corresponding separating partitions 23, channels 24, 27 and injectors 31, whose characteristics may be deduced in an identical way to what has been described above.

Additionally, for convenience of construction, the extrusion head 4 preferably has a modular structure, and preferably comprises, for example:

a first module 4_1 forming the first portion 10 of the extrusion head 4, a second module 4_2 forming the second portion 20 of the extrusion head 4, a first blade 41, called the "transition blade", which is interposed between the first module 4_1 and the second module 4_2, to provide a transition between the first portion 10 and the second portion 20, and more particularly to provide pre-shaping of the underlayer 12, made of the first elastomer compound M1, in order to distribute the flow of first elastomer compound M1, before said flow of first elastomer compound M1 penetrates into the second portion 20 of the extrusion head, between, on the one hand, the underlayer base 40 and, on the other hand, the inlet(s) of the shaping channel(s) 24 which are intended to form the corresponding wedge(s) 25 in one piece with said underlayer base 40, and a second blade 42, which forms the third portion 30 of the extrusion head 4, and which carries the injector(s) 31.

Said modules 4_1, 4_2 and blades 41, 42 are assembled and fixed together, preferably by screwing, contiguously to each other so as to provide continuity of the extrusion head 4 in the longitudinal direction X.

Preferably, as is clearly visible in FIGS. 3, 4, 5 and 10, the third portion 30 of the extrusion head 4, in this case preferably the second blade 42, comprises a plurality of injectors 31 which are distributed along the lateral direction Y and are intended to form the same number of separate decoupling interfaces 33.

Figure 5:
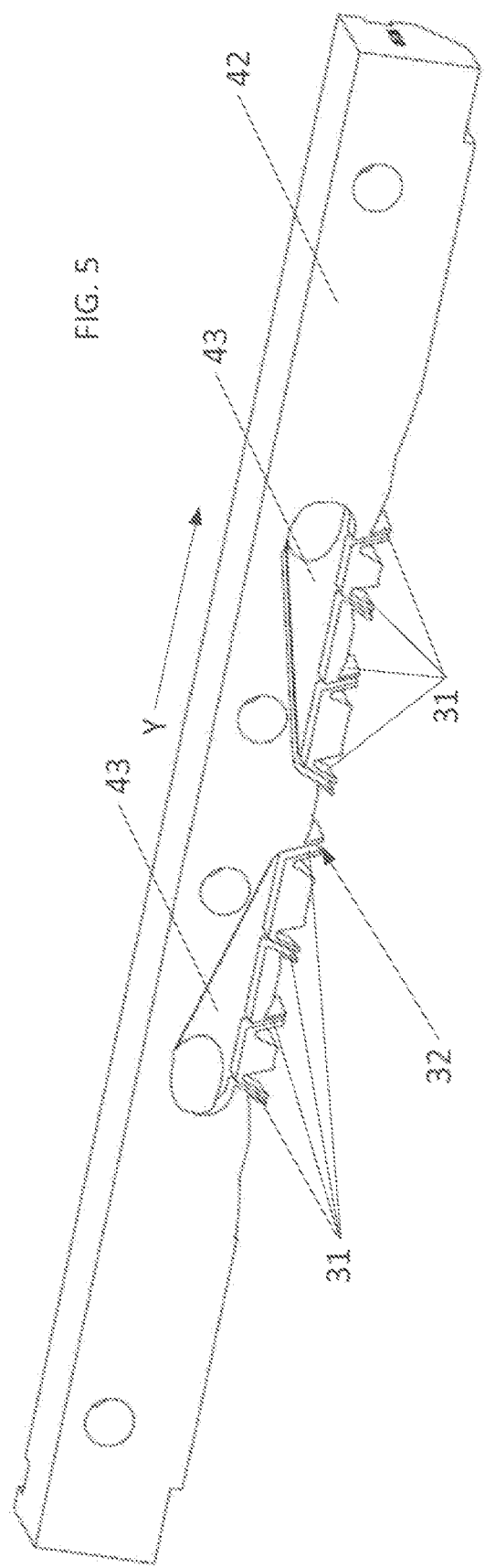
FIG. 5 shows, in a perspective view, a blade fitted to the third portion of the extrusion head of FIGS. 2 to 4 and carrying a plurality of injectors, each of which is intended to generate a decoupling interface between a tread pattern block and an adjacent wedge for the lateral support of said tread pattern block.

Preferably, and notably in order to limit the number of extruders required to prepare the first elastomer compound M1 and to route the first elastomer compound M1 through the extrusion head 4, said plurality of injectors 31, or possibly all the injectors 31 carried by the second blade 42, may then be supplied by a common injection line 43, as is visible, notably, in FIGS. 5 and 10.

Particularly preferably, one or more of said injectors 31 supplied by the same common injection line 43 may be fitted with flow rate control screws 44 for adjusting the distribution of the third elastomer compound M3 between the different injectors 31.

Advantageously, these flow rate adjustment screws 44 make it possible to select, and to equalize if necessary, the thicknesses E33 of the decoupling interfaces 33, notably on the basis of the rheological properties of the different elastomer compounds M1, M2, M3.

For simplicity of representation, said flow rate control screws 44 have been shown in FIGS. 2 and 3 as resembling the tapped holes into which said screws are inserted to modify the passage cross section of the injectors 31 in the common injection line 43.

As mentioned above, the third elastomer compound M3 is different from the first elastomer compound M1 and the second elastomer compound M2.

The use of the term "different" here is taken to mean that said elastomer compounds M1, M2, M3 have different compositions from each other, and therefore different mechanical properties.

One of the accepted criteria for the selection of the elastomer compounds M1, M2, M3, with regard, notably, to the desired decoupling function, is the stiffness of the compound in question, when said compound has been vulcanized in the course of the tire curing operation.

The accepted parameter for characterizing and selecting the elastomer compounds M1, M2, M3 is preferably the complex dynamic shear modulus, denoted G*. This is because said complex dynamic shear modulus G* is representative of the stiffness of the elastomer compound in question, and characterizes the behavior of the elastomer compound in question when the latter is subjected to an alternating shear stress. Said complex dynamic shear modulus G* has, in its representation in the complex plane, a real part, also called the "elastic part" and denoted G', which characterizes the elastic behavior of the compound, and an imaginary part, also called the "viscous part" and denoted G'', which characterizes the energy dissipation due to the viscous behavior of the compound.

The term "dynamic loss", or "viscoelastic loss", denoted Tgδ, designates the ratio of the viscous part G'' to the elastic part G', that is to say the tangent of the argument δ of said complex dynamic shear modulus G*: $Tg\delta = Tan(\delta) = Tan(Arg(G^*)) = G''/G'$.

The viscoelastic loss Tgδ and the complex dynamic shear modulus G* may be determined according to the ASTM D 5992-96 standard, by measuring the dynamic properties of the elastomer compound with a viscoanalyser (a Metravib VA4000 in this case). The dynamic properties are measured in a sample of elastomer compound that has been vulcanized, in this case more particularly vulcanized in the curing conditions applicable to the tire incorporating profiled element 2, the sample taking the form of a cylindrical test specimen with a thickness of 2 mm and a cross section of 78.5 mm². The response of the sample of elastomeric compound to a simple alternating sinusoidal shear stress, having a peak-to-peak amplitude of 0.7 MPa and a frequency of 10 Hz, is recorded.

A temperature scan with a constant rate of temperature rise of +1.5° C./min is also carried out during this measurement operation. The glass transition temperature Tglass of the sample is the temperature at which the dynamic loss Tgδ reaches a maximum during the temperature scan.

The value of G* measured at 23° C., or at 60° C. if appropriate, is representative of the stiffness of the elastomer compound in question, that is to say its resistance to deformation, notably its elastic deformation.

It will be noted that, in addition to the parameters that are actually accepted for measuring the complex dynamic shear modulus G* of each elastomer compound, if the measurement parameters are identical, it is the order of magnitude and the relative value of said modulus G* from one elastomer compound to another that are important for quantifying the stiffness of said elastomer compound relative to the other elastomer compounds, and therefore the behavior of said elastomer compound in the vulcanized tire.

In the present case, the elastomer compounds M1, M2, M3 are preferably chosen in such a way that the first elastomer compound M1, forming the underlayer 12 and the wedge 25, has a complex dynamic shear modulus G*_M1 that is strictly greater than the complex dynamic shear modulus G*_M2 of the second elastomer compound M2 forming the tread pattern block 22; that is to say, G*_M1>G*_M2.

Thus the wedges 25 have an intrinsically stiffer behavior, and notably greater stiffness in compression and/or in shear, than the tread pattern blocks 22, which are intrinsically "softer" in order to promote the grip of the tire on the roadway.

Similarly, and preferably, the complex dynamic shear modulus G*_M3 of the third elastomer compound M3 forming the decoupling interface 33 is different from the complex dynamic shear moduli G*_M1, G*_M2 of the first and second elastomer compounds M1, M2 respectively.

Thus it is possible to differentiate the behavior of the decoupling interface 33 from the behavior of the wedge 25 and from the behavior of the adjacent tread pattern block 22 bordering said decoupling interface 33, so that said decoupling interface 33 does not in itself interfere significantly with the specific behavior of the wedge 25 or the specific behavior of the tread pattern block 22.

More particularly, the elastomer compounds M1, M2, M3 can preferably be chosen in such a way that the complex dynamic shear modulus G*_M3 of the third elastomer compound M3 forming the decoupling interface 33 is strictly smaller than the respective complex dynamic shear moduli G*_M1, G*_M2 of the first and second elastomer compounds M1, M2; that is to say, G*_M3<G*_M1 and G*_M3<G*_M2.

Thus the decoupling interface 33 is intrinsically "softer" than the wedge 25 and the tread pattern block 22 that are connected by said decoupling interface 33, making it possible, notably, to limit the transmission of deformations or displacements under stress from the tread pattern block 22 towards the wedge 25, or conversely from the wedge 25 towards the tread pattern block 22, via the interface 33, since the corresponding stresses may be absorbed by the deformations (elastic and/or viscoelastic) of the decoupling interface 33. In particular, as mentioned above, a "soft" decoupling interface 33 makes it possible to limit the lateral flip-flop of the wedges 25, thus improving the drift performance of the tire.

Furthermore, since the third elastomer compound M3 has a small complex dynamic shear modulus G*_M3 compared with the other elastomer compounds M1, M2, the amount of heat dissipated by deformations of the decoupling interface 33, and therefore the energy lost cyclically due to the effect of running, is relatively small, thus enabling the rolling resistance of the resulting tire to be reduced overall.

By way of guidance, preferably, the first elastomer compound M1 has a complex dynamic shear modulus G*_M1 of between 20 MPa and 40 MPa, equal to 30 MPa for example, while the second elastomer compound M2 has a complex dynamic shear modulus G*_M2 of between 1 MPa and 2 MPa, equal to 1.5 MPa for example, and the third elastomer compound M3 has a complex dynamic shear modulus G*_M3 of between 0.25 MPa and MPa, equal to 0.4 MPa for example. Here, said complex dynamic shear moduli are preferably measured at 60° C.

It will be noted that these ranges of values, and more generally the values and dimensions specified in the present request, are notably adapted to the production of tires for private cars, typically tires whose dimensions correspond to 15- to 20-inch rims.

On the other hand, the decoupling interface 33 has a thickness E33, considered between the tread pattern block 22 and the lateral wall 26 of the wedge 25, that is preferably between 0.5 mm and 4 mm, being equal to 2 mm for example.

This thickness E33 will advantageously be chosen in such a way that the decoupling interface 33 is thick enough to provide the desired decoupling effect between the tread pattern block 22 and the wedge 25, while being thin enough to avoid affecting the overall behavior of the tread 1 and the tire.

The thickness E33, here preferably measured perpendicularly to the lateral face 26 of the wedge 25, is preferably constant over the whole height H33 of the decoupling interface 33, and therefore over the whole height to which the wedge 25 projects from the underlayer base 40.

Said thickness E33 is preferably smaller than the "length" L33 of the interface E33, considered in a cross section normal to the longitudinal direction X, that is to say to the length of the lateral wall 26 of the wedge, which is here preferably equal to the length of the segment of straight line that forms the side of the triangle and joins the base 25B to the peak of the wedge.

It will be noted that, allowing for the effect of inflation of the third elastomer compound M3 that may be observed when said third elastomer compound M3 is released from the injector 31, the width of the injection slot 32 may be chosen to be less than the desired thickness E33 of the decoupling interface 33, being for example equal to 0.8 times said desired thickness E33.

Additionally, in a preferred arrangement that may form a separate complete disclosure, and notably regardless of the means used for interposing the decoupling interface 33 between the tread pattern block 22 and the wedge 25, the first and second portions of the extrusion head 10, 20 are arranged so as to create with the first elastomer compound M1 at least one cradle 45 comprising, in one piece, an underlayer base 40 which interconnects a first wedge 25 and a second wedge 25' which are separate from each other in the lateral direction Y and which project in the vertical direction Z, towards the extrusion head 4, from the underlayer base 40, so as to form a first lateral edge 46 of said cradle 45 and a second lateral edge 47 of said cradle 45, and in that said cradle 45 is filled with the second elastomer compound M2 in order to form a tread pattern block 22, there being interposed, on the one hand, between said second elastomer compound M2 and the first lateral edge 46 of the cradle, here delimited by the lateral wall 26 of the first wedge 25, a first layer of third elastomer compound M3 to form a first decoupling interface 33 between the tread pattern block 22 and the first wedge 25, and, on the other hand, between said second elastomer compound M2 and the second lateral edge 47 of said cradle 45, here delimited by the lateral face 26' of the second wedge 25', a second layer of third elastomer compound M3 to form a second decoupling interface 33' between said tread pattern block 22 and the second wedge as is visible, notably, in the detail of FIG. 1.

The shapes and dimensions of the wedges 25, 25' of the underlayer base 40, and their respective proportions, may be as indicated above.

Advantageously, the fact that the tread pattern block 22 in question is contained in a cradle 45 according to the disclosure makes it possible, notably, to achieve excellent drift stability.

By using two decoupling interfaces 33, 33', spaced apart and separate, located laterally on either side of the same tread pattern block 22, it is possible, as mentioned above, to decouple the operation of said tread pattern block 22 from the operation of the two wedges 25' which support it laterally on each of its sides.

Preferably, as is visible, notably, in FIG. 1, there are formed at least a first cradle and a second cradle 45', separate from each other and spaced apart in the lateral direction Y, and intended to receive, respectively, a first tread pattern block 22 and a second tread pattern block 22', and said first and second cradles 45, 45' are separated in the lateral direction Y by means of a trench 48 which is the precursor of a circumferential groove of the tread 1, and which is formed by providing, preferably in the first portion 10 of the extrusion head, a scraper 50 which comes into contact with the receiving surface 5 to eliminate the first elastomer compound M1 forming the underlayer 12 at the position of said trench 48.

Said circumferential grooves make it possible, notably, to evacuate water when the tire runs on a wet roadway.

If necessary, as shown in FIG. 1, the bottom of the trench 48, which laterally interrupts the underlayer 12, may receive a thin lining layer 49, made of the second elastomer compound M2, the height of which will evidently be strictly lower than the overall height of the wedge H25, and lower than the cumulative height of the underlayer base 40 and the tread pattern block 22 covering said underlayer base, so that the hollow shape of the trench 48 is retained. Said lining layer 49 may be guided and shaped by an auxiliary flow channel 27_2 provided in the second portion 20 of the extrusion head 4, which is prolonged in the third portion 30 of the extrusion head by a suitable configuration of the second blade 42, as shown in FIGS. 4, 8, 9 and 10. Such a lining sub-layer 49 may enable the lateral cohesion of the profiled element 2 to be ensured or improved, by creating a link between neighboring cradles 45', for example in order to facilitate the handling and transfer of the profiled element 2 in one piece on the tire reinforcement. It may also contribute to the lining of the reinforcement, and thus to the improvement of the finish of the tire crown. Said lining sub-layer 49 may also contribute to the improvement of the support of the tread pattern blocks 22 by the wedges 25, and more generally the improvement of the behavior of the profiled element 2 in response to lateral stresses.

The disclosure as such also relates to an extrusion installation for implementing the process according to the disclosure, and notably to an extrusion installation comprising an extrusion head 4 having a first portion 10, a second portion 20 and a third portion 30 as described above, provided with one or more separating partitions 23 which each delimit a shaping channel 24 with respect to a flow channel 27 and which, respectively, precede one or more injectors 31 for interposing a decoupling interface 33 between the tread pattern block 22 emerging from the flow channel 27 and the corresponding wedge 25 emerging from the shaping channel 24.

The disclosure also relates to one or other of the profiled elements 2 that can be produced according to one or other of the above variants of the process, as well as to a tire for a vehicle wheel whose tread 1 comprises such a profiled element 2.

Thus, in particular, the disclosure relates to a tread 1 comprising a sub-layer 12 made of a first elastomer compound M1, at least one wedge 25 formed in one piece with said sub-layer 12 so as to project on said sub-layer, at least one tread pattern block 22 made of a second elastomer compound M2 having a complex dynamic shear modulus $G^*\_M2$ strictly smaller than the complex dynamic shear modulus $G^*\_M1$ of the first elastomer compound M1, and an interface layer called the "decoupling interface" 33 which is made of a third elastomer compound M3 having a complex dynamic shear modulus $G^*\_M3$ which is strictly smaller than the modulus $G^*\_M2$ of the second elastomer compound M2, and consequently strictly smaller than the modulus $G^*\_M1$ of the first elastomer compound M1, said decoupling interface 33 being interposed between a lateral wall 26 of the wedge 25 and a corresponding lateral wall 22S of the tread pattern block 22, so as to isolate said lateral wall 26 of the wedge 25 from the tread pattern block 22 while allowing said tread pattern block 22, and here more particularly the lateral wall 22S of said tread pattern block located facing the lateral wall 26 of the wedge 25, to bear indirectly and laterally in this way against said lateral wall 26 of the wedge 25, via said decoupling interface 33.

The shapes, dimensions and characteristics of the elastomer compounds, etc., within such a tread 1 may evidently be deduced from, or selected from, the preceding description.

Similarly, the disclosure relates to a tread 1 comprising at least one cradle 45 which comprises, in one piece, an underlayer base 40 made of a first elastomer compound M1, which interconnects a first wedge 25 and a second wedge 25' which are spaced apart from each other in the lateral direction Y of the tread which corresponds to the axial direction of the tire when the tread 1 is in place on said tire, these first and second wedges 25, 25' projecting from the underlayer base 40 in a vertical direction Z corresponding to the radial direction of the tire, so that each of said first and second wedges 25, 25' has a lateral wall 26, 26' facing the other wedge in the lateral direction Y, thus forming a first lateral edge 46 of said cradle 45 and a second lateral edge 47 of said cradle 45, said tread further comprising a tread pattern block 22 made of a second elastomer compound M2, which fills said cradle 45, preferably to a continuous height over the whole width of the cradle, this height preferably being flush with the respective peaks of the two wedges 25, 25'. Preferably, said tread 1 further comprises a first layer of a third elastomer compound M3 to form a first decoupling interface 33 interposed between the tread pattern block 22 and the lateral wall 26 of the first wedge 25, and a second layer of the third elastomer compound M3 to form a second decoupling interface 33' between said tread pattern block 22 and the lateral wall 26' of the second wedge 25'. Here again, the third compound elastomer M3 preferably has a complex dynamic shear modulus $G^*\_M3$ that is strictly smaller than the modulus $G^*\_M2$ of the second elastomer compound, and strictly smaller than the modulus $G^*\_M1$ of the first elastomer compound.

Finally, the disclosure naturally relates to a tire for a vehicle wheel that has a tread 1 according to any of the above variants.

Evidently, the disclosure is not limited in any way to the variant embodiments described in the above text, and those skilled in the art will notably be capable of freely separating or combining with each other any one or other of the aforementioned characteristics, or replacing them with equivalents.

What is claimed is:

1. A process for manufacturing a tread for a tire of a vehicle wheel, in the course of which a profiled element is formed by jointly extruding a plurality of elastomer compounds, in a common direction of flow corresponding to the longitudinal direction of said profiled element, through a gap which is delimited on the one hand by an extrusion head and on the other hand by a receiving surface, such that the cross section of the profiled element can be shaped in thickness along a direction called the vertical direction which is perpendicular to the longitudinal direction and to the receiving surface, and in width along a direction called the lateral direction which is perpendicular to the longitudinal direction and to the vertical direction, said process comprising a first step (a) in which, in a first portion of the extrusion head provided with first inlet channels, a first elastomer compound is introduced into the gap through said first inlet channels and comes into contact with the receiving surface to form an underlayer, and then a second step (b) in which, in a second portion of the extrusion head located downstream of the first portion of the extrusion head in the longitudinal direction and provided with second inlet channels, a second elastomer compound intended to form a tread pattern block is introduced into the gap through said second inlet channels, the second portion of the extrusion head having at least one separating partition which projects into the thickness of the gap and which extends continuously in the longitudinal direction so that said separating partition delimits, on either side of said separating partition in the lateral direction, on the one hand a shaping channel enabling part of the first elastomer compound to form, in one piece with the underlayer, a protrusion defining a wedge which projects in the vertical direction for the purpose of providing support for the tread pattern block in the lateral direction, said wedge having for this purpose a lateral wall which runs along the separating partition and which, in a cross section normal to the longitudinal direction, extends in a direction secant to the receiving surface, and, on the other hand, a flow channel which enables the second elastomer compound to flow along the second portion of the extrusion head, in contact with the separating partition, parallel to the lateral wall of the wedge and without forming a joint with said lateral wall of the wedge, said process further including a third step (c) in which, in a third portion of the extrusion head extending downstream of the second portion of the extrusion head, an injector is provided, the injector being located in the longitudinal prolongation of the separating partition in the longitudinal direction and being provided with an injection slot through which a third elastomer compound, different from the first elastomer compound and the second elastomer compound, is injected, in such a way that said third elastomer compound is placed between, and forms a joint with, the first elastomer compound emerging from the shaping channel and the second elastomer compound emerging from the flow channel, by covering the lateral wall of the wedge so as to form an interface layer called the decoupling interface which isolates said lateral wall of the wedge from the tread pattern block while enabling said tread pattern block to come to bear thus laterally against said lateral wall of the wedge indirectly, via said decoupling interface.

2. The process according to claim 1, wherein the first elastomer compound, forming the underlayer and the wedge, has a complex dynamic shear modulus that is strictly greater than the complex dynamic shear modulus of the second elastomer compound forming the tread pattern block, and wherein the complex dynamic shear modulus of the third elastomer compound forming the decoupling interface is different from the respective complex dynamic shear moduli of the first and second elastomer compounds.

3. The process according to claim 2, wherein the complex dynamic shear modulus of the third elastomer compound forming the decoupling interface is strictly smaller than the respective complex dynamic shear moduli of the first and second elastomer compounds.

4. The process according to claim 1, wherein the first elastomer compound has a complex dynamic shear modulus of between 20 MPa and 40 MPa, the second elastomer compound has a complex dynamic shear modulus of between 1 MPa and 2 MPa, and the third elastomer compound has a complex dynamic shear modulus of between 0.25 MPa and 0.55 MPa.

5. The process according to claim 4, wherein the complex dynamic shear modulus of the first elastomer compound is approximately 30 MPa, the complex dynamic shear modulus of the second elastomer compound is approximately 1.5 MPa, and the complex dynamic shear modulus of the third elastomer compound is approximately 0.4 MPa.

6. The process according to claim 4, wherein the complex dynamic shear modulus of the first elastomer compound is approximately 30 MPa.

7. The process according to claim 4, wherein the complex dynamic shear modulus of the second elastomer compound is approximately 1.5 MPa.

8. The process according to claim 4, wherein the complex dynamic shear modulus of the third elastomer compound is approximately 0.4 MPa.

9. The process according to claim 1, wherein the decoupling interface has a thickness, considered between the tread pattern block and the lateral wall of the wedge, that is between 0.5 mm and 4 mm.

10. The process according to claim 9, wherein the thickness is approximately 2 mm.

11. The process according to claim 1, wherein the decoupling interface, and therefore the injection slot, extend, in the vertical direction, over the whole of the height which is common to the lateral wall of the wedge made of the first elastomer compound on the one hand, and to the tread pattern block made of the second elastomer compound, which bears laterally on said wedge via said decoupling interface, on the other hand.

12. The process according to claim 1, wherein the wedge has a cross section of triangular shape, whose base rests on the receiving surface and whose peak points towards the extrusion head.

13. The process according to claim 1, wherein the wedge includes a plurality of wedges, wherein the decoupling interface includes a plurality of decoupling interfaces, wherein the first and second portions of the extrusion head are arranged so as to create with the first elastomer compound the underlayer including at least one cradle comprising, in one piece, an underlayer base which interconnects a first wedge and a second wedge of the plurality of wedges which are separate from each other in the lateral direction and which project in the vertical direction, towards the extrusion head, from the underlayer base, so as to form a first lateral edge of said cradle and a second lateral edge of said cradle, and wherein said cradle is filled with the second elastomer compound in order to form the tread pattern block, there being interposed, on the one hand, between said second elastomer compound and the first lateral edge of the cradle, a first layer of the third elastomer compound to form a first decoupling interface of the plurality of decoupling interfaces between the tread pattern block and the first wedge, and, on the other hand, between said second elastomer compound and the second lateral edge of said cradle, a second layer of the third elastomer compound to form a second decoupling interface of the plurality of decoupling interfaces between said tread pattern block and the second wedge.

14. The process according to claim 13, wherein the tread pattern block includes a plurality of tread pattern blocks, wherein there are formed at least a first cradle and a second cradle of the at least one cradle, separate from each other and spaced apart in the lateral direction, and intended to receive, respectively, a first tread pattern block and a second tread pattern block of the plurality of tread pattern blocks, and wherein said first and second cradles are separated in the lateral direction by means of a trench which is a precursor of a circumferential groove of the tread, and which is formed by providing, in the first portion of the extrusion head, a scraper which comes into contact with the receiving surface to eliminate the first elastomer compound forming the underlayer at the position of said trench.

15. The process according to claim 1, wherein the injector includes a plurality of injectors, wherein the decoupling interface includes a plurality of decoupling interfaces, wherein the third portion of the extrusion head comprises the plurality of injectors which are distributed along the lateral direction and are intended to form the same number of separate decoupling interfaces of the plurality of decoupling interfaces, wherein said injectors are supplied by a common injection line, and wherein one or more of said injectors is fitted with flow rate control screws for adjusting a distribution of the third elastomer compound between the injectors.

16. The process according to claim 1, wherein the receiving surface is a roller.

* * * * *